(12) United States Patent
Takahashi et al.

(10) Patent No.: US 9,441,733 B2
(45) Date of Patent: Sep. 13, 2016

(54) CONTINUOUSLY VARIABLE TRANSMISSION AND A HYDRAULIC CONTROL METHOD THEREOF

(71) Applicants: JATCO LTD, Fuji-shi, Shizuoka (JP); NISSAN MOTOR CO., LTD., Yokohama-shi, Kanagawa (JP)

(72) Inventors: Seiichiro Takahashi, Isehara (JP); Takashi Eguchi, Machida (JP); Tomohiro Utagawa, Sagamihara (JP); Tomoyuki Mizuochi, Sagamihara (JP); Hisao Nobu, Hachioji (JP); Kenji Sakakibara, Sagamihara (JP); Takahiro Ikeda, Zama (JP); Masayuki Shimizu, Ayase (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 36 days.

(21) Appl. No.: 14/405,289

(22) PCT Filed: May 28, 2013

(86) PCT No.: PCT/JP2013/064702
§ 371 (c)(1),
(2) Date: Dec. 3, 2014

(87) PCT Pub. No.: WO2013/183483
PCT Pub. Date: Dec. 12, 2013

(65) Prior Publication Data
US 2015/0148157 A1 May 28, 2015

(30) Foreign Application Priority Data
Jun. 8, 2012 (JP) .................................. 2012-130650

(51) Int. Cl.
*F16H 55/56* (2006.01)
*F16H 59/00* (2006.01)
(Continued)

(52) U.S. Cl.
CPC ........ *F16H 61/66272* (2013.01); *F16H 9/125* (2013.01); *F16H 59/20* (2013.01); *F16H 2061/66277* (2013.01)

(58) Field of Classification Search
CPC .................. F16H 61/66272; F16H 61/66259; F16H 61/12; Y10T 477/624; Y10T 477/6237
USPC ....................................... 474/8, 28
See application file for complete search history.

(56) References Cited

U.S. PATENT DOCUMENTS 4,651,595 A    3/1987  Miyawaki
4,672,864 A *  6/1987  Morimoto ............. B60W 10/02
                                                    474/28
(Continued)

FOREIGN PATENT DOCUMENTS

JP    59-099148 A   6/1984
JP    60-053256 A   3/1985
(Continued)

*Primary Examiner* — Henry Liu
(74) *Attorney, Agent, or Firm* — Foley & Lardner LLP

(57) ABSTRACT

A transmission controller determines whether a shift is a kickdown, and when the shift is determined as the kickdown, the target line pressure is increased to a first target pressure corresponding to an input torque to a continuously variable transmission increased by the kickdown; the transmission controller then determines whether the line pressure has reached the first target pressure, and if determined that the line pressure has reached the first target pressure, the target line pressure is increased to a second target pressure higher than the first target pressure.

7 Claims, 5 Drawing Sheets

(51) Int. Cl.
*F16H 61/00* (2006.01)
*F16H 63/00* (2006.01)
*F16H 61/662* (2006.01)
*F16H 59/20* (2006.01)
*F16H 9/12* (2006.01)

(56) References Cited

U.S. PATENT DOCUMENTS

| | | | | |
|---|---|---|---|---|
| 4,708,694 A * | 11/1987 | Sakai | F16H 61/66259 | 474/28 |
| 4,718,308 A * | 1/1988 | Haley | B60W 10/02 | 474/28 |
| 4,731,044 A * | 3/1988 | Mott | F16H 61/66272 | 474/101 |
| 4,747,807 A * | 5/1988 | Nakamura | F16H 61/66259 | 474/28 |
| 4,767,382 A * | 8/1988 | Tezuka | B60W 30/18 | 474/28 |
| 4,781,655 A * | 11/1988 | Tezuka | B60W 30/18 | 474/12 |
| 4,853,858 A * | 8/1989 | Kumura | B60W 10/04 | 474/12 |
| 4,916,982 A * | 4/1990 | Suzuki | B60W 10/06 | 474/28 |
| 4,923,433 A * | 5/1990 | Tanaka | B60W 30/18 | 474/11 |
| 4,948,370 A * | 8/1990 | Yamada | F16H 61/66259 | 474/28 |
| 5,059,157 A * | 10/1991 | Sato | F16H 61/66259 | 474/18 |
| 5,222,417 A * | 6/1993 | Sato | F16H 61/0021 | 137/330 |
| 5,257,960 A * | 11/1993 | Sato | F16H 61/66259 | 474/28 |
| 5,720,692 A * | 2/1998 | Kashiwabara | F16H 61/66272 | 474/28 |
| 5,871,411 A * | 2/1999 | Senger | F16H 61/66254 | 474/11 |
| 6,110,062 A * | 8/2000 | Fujikawa | F16H 61/662 | 474/28 |
| 6,217,469 B1 * | 4/2001 | Sawada | F16H 61/66272 | 474/13 |
| 6,219,608 B1 * | 4/2001 | Abo | F16H 61/66259 | 474/28 |
| 6,287,227 B1 * | 9/2001 | Vahabzadeh | F16H 61/66259 | 474/18 |
| 6,461,261 B2 * | 10/2002 | Yamamoto | F16H 61/66272 | 474/8 |
| 6,485,392 B2 * | 11/2002 | Miyazaki | F16H 61/66272 | 474/11 |
| 6,513,610 B2 * | 2/2003 | Ochiai | B60K 31/0008 | 180/176 |
| 7,112,154 B2 * | 9/2006 | Wakahara | F16H 61/0021 | 474/18 |
| 7,192,371 B2 * | 3/2007 | Yamamoto | F16H 61/66272 | 474/18 |
| 7,229,372 B2 * | 6/2007 | Shimanaka | F16H 61/66272 | 474/18 |
| 7,229,373 B2 * | 6/2007 | Yamamoto | F16H 61/66272 | 474/18 |
| 7,546,196 B2 * | 6/2009 | Izumi | F16H 61/66254 | 474/18 |
| 7,651,422 B2 * | 1/2010 | Yamamoto | F16H 61/66259 | 474/28 |
| 7,699,729 B2 * | 4/2010 | Inoue | F16H 61/66259 | 474/18 |
| 7,789,780 B2 * | 9/2010 | Iwasa | F16H 59/70 | 474/18 |
| 7,806,791 B2 * | 10/2010 | Izumi | F16H 61/66272 | 474/18 |
| 7,918,753 B2 * | 4/2011 | Murakami | F16H 61/66272 | 474/18 |
| 7,931,551 B2 * | 4/2011 | Katou | F16H 61/66272 | 474/18 |
| 7,993,225 B2 * | 8/2011 | Ogata | F16H 61/12 | 474/28 |
| 8,002,654 B2 * | 8/2011 | Oshiumi | F16H 61/66272 | 474/28 |
| 8,096,906 B2 * | 1/2012 | Inoue | F16H 61/66272 | 474/18 |
| 8,105,191 B2 * | 1/2012 | Toyoda | F16H 61/66259 | 474/12 |
| 8,133,140 B2 * | 3/2012 | Yamaguchi | F16H 61/66272 | 474/18 |
| 8,157,681 B2 * | 4/2012 | Iwasa | F16H 61/66259 | 474/28 |
| 8,517,871 B2 * | 8/2013 | Ogata | F16H 61/66272 | 474/18 |
| 8,535,186 B2 * | 9/2013 | Asaoka | F16H 61/66259 | 474/28 |
| 8,827,850 B2 * | 9/2014 | Kodama | F16H 61/66259 | 474/11 |
| 2002/0173391 A1 * | 11/2002 | Endo | B60K 6/44 | 474/18 |
| 2004/0162183 A1 * | 8/2004 | Wakahara | F16H 1/0021 | 477/18 |
| 2004/0171444 A1 * | 9/2004 | Yamamoto | F16H 61/66272 | 474/28 |
| 2004/0171445 A1 * | 9/2004 | Yamamoto | F16H 61/66259 | 474/28 |
| 2004/0235595 A1 * | 11/2004 | Luh | F16H 61/66272 | 474/8 |
| 2005/0014604 A1 | 1/2005 | Sakakibara et al. | | |
| 2005/0192131 A1 * | 9/2005 | Yamamoto | F16H 61/66272 | 474/18 |
| 2005/0221929 A1 * | 10/2005 | Oshita | B60W 10/06 | 474/28 |
| 2005/0221930 A1 * | 10/2005 | Oshita | F16H 61/12 | 474/28 |
| 2005/0277501 A1 * | 12/2005 | Kuras | B60K 6/46 | 474/8 |
| 2006/0058129 A1 * | 3/2006 | Kim | F16H 61/66254 | 474/18 |
| 2006/0073924 A1 * | 4/2006 | Izumi | F16H 61/66254 | 474/28 |
| 2006/0276279 A1 * | 12/2006 | Suzuki | F16H 61/12 | 474/8 |
| 2007/0082771 A1 * | 4/2007 | Izumi | F16H 61/66272 | 474/18 |
| 2007/0142142 A1 * | 6/2007 | Yamaguchi | F16H 61/66272 | 474/28 |
| 2007/0232423 A1 * | 10/2007 | Katou | F16H 61/66272 | 474/28 |
| 2007/0298918 A1 * | 12/2007 | Toyoda | F16H 61/66259 | 474/28 |
| 2008/0004141 A1 * | 1/2008 | Toyoda | F16H 61/0021 | 474/28 |
| 2008/0153636 A1 * | 6/2008 | Inoue | F16H 61/66272 | 474/28 |
| 2009/0286633 A1 * | 11/2009 | Ogata | F16H 61/66272 | 474/28 |
| 2009/0298625 A1 * | 12/2009 | Kodama | F16H 61/66259 | 474/11 |
| 2010/0151977 A1 * | 6/2010 | Ogata | F16H 61/66259 | 474/28 |
| 2011/0118066 A1 * | 5/2011 | Fujimura | F16H 61/12 | 474/28 |
| 2011/0230285 A1 * | 9/2011 | Hinami | F16H 61/0021 | 474/28 |
| 2011/0269583 A1 * | 11/2011 | Kawakami | F16H 61/0031 | 474/28 |
| 2012/0143448 A1 * | 6/2012 | Tohyama | F16H 61/12 | 701/51 |
| 2013/0109516 A1 * | 5/2013 | Hattori | F16H 61/12 | 474/28 |
| 2013/0165282 A1 * | 6/2013 | Hattori | F16H 9/125 | 474/28 |

(56) References Cited

U.S. PATENT DOCUMENTS

2014/0128187 A1* 5/2014 Iraha ................ F16H 61/0206
                                                    474/8
2014/0274505 A1* 9/2014 Kinoshita ................ F16H 9/16
                                                    474/28

FOREIGN PATENT DOCUMENTS

| JP | 62-028561 A | 2/1987 |
| JP | 07-259940 A | 10/1995 |
| JP | 2005-036820 A | 2/2005 |
| JP | 2007-132420 A | 5/2007 |

* cited by examiner

CONTINUOUSLY VARIABLE TRANSMISSION AND A HYDRAULIC CONTROL METHOD THEREOF

TECHNICAL FIELD

The present invention relates to a hydraulic control of a continuously variable transmission.

BACKGROUND ART

In kickdown control of a continuously variable transmission, a primary pressure supplied to a primary pulley is reduced and a secondary pressure supplied to a secondary pulley is increased, in order to secure a differential thrust for achieving a target shift speed.

A continuously variable transmission disclosed in JP59-99148A demonstrates a technique of promptly increasing a line pressure that serves as a source pressure of the primary pressure and the secondary pressure, to secure an hydraulic pressure necessary for the kickdown.

SUMMARY OF INVENTION

There are many cases with continuously variable transmissions in which a drain regulator valve is employed as a regulator valve for regulating line pressure, primary pressure and secondary pressure.

The drain regulator valve includes a spool that opens and closes a drain port and a spring for biasing the spool, and is configured to drain a portion of a source pressure supplied to the regulator valve based on a signal pressure supplied to the regulator valve from a solenoid or the like, and control a regulated hydraulic pressure to a hydraulic pressure corresponding to the signal pressure (target hydraulic pressure) by a feedback circuit that causes the regulated hydraulic pressure to act on the spool.

However, in a case in which the regulator valve is configured of the drain regulator valve, an actual hydraulic pressure repeatedly overshoots and undershoots the target hydraulic pressure in a situation in which the target hydraulic pressure increases rapidly due to a kickdown. As a result, a lack occurs in a belt clipping force by pulleys at a timing at which the undershooting occurs, and thus the belt may slip.

The cause of this is as described below. In a case in which an oil flow balance becomes insufficient due to a rapid increase in a target hydraulic pressure, a drain port of the regulator valve is closed to increase the actual hydraulic pressure as much as possible; at a timing at which the drain port is closed, the hydraulic pressure rapidly increases and a discharge pressure of the oil pump increases by an increase in rotational speed of the engine. Accordingly, the actual hydraulic pressure overshoots the target hydraulic pressure.

Upon occurrence of the overshooting, the spool is then pushed back in a direction to open the drain port by an action of the feedback circuit, to lower the actual hydraulic pressure. However, due to a delay caused by a spring mass system, the drain port is not immediately closed even after the actual hydraulic pressure reaches the target hydraulic pressure. As a result, the drained content becomes excessive and the undershooting of the actual hydraulic pressure occurs (occurrence of the undershooting caused by a shake-back).

An object of the present invention therefore is to prevent the belt from slipping by avoiding any undershooting of the actual hydraulic pressure caused by a shake-back at the time of a kickdown.

According to an aspect of the present invention, a continuously variable transmission is provided, which includes a primary pulley, a secondary pulley and a power transmission member wound between the pulleys and shifts by changing a groove width of each of the pulleys by changing a primary pressure supplied to the primary pulley and a secondary pressure supplied to the secondary pulley.

This continuously variable transmission includes an oil pump driven by an engine, and a line pressure regulator valve which is a drain regulator valve that reduces a discharge pressure of the oil pump to regulate a line pressure which is a source pressure of the primary pressure and the secondary pressure, the line pressure regulator valve including a spool on whose edges a signal pressure corresponding to a target line pressure and the line pressure are acted and which opens and closes a drain port in accordance with a stroke, and a spring that biases the spool.

Thereafter, the continuously variable transmission determines whether the shift is a kickdown, and when the shift is determined as the kickdown, the target line pressure is increased to a first target pressure corresponding to an input torque to the continuously variable transmission that increases by the kickdown, then determines whether the line pressure has reached the first target pressure, and when it is determined that the line pressure has reached the first target pressure, the target line pressure is increased to a second target pressure higher than the first target pressure.

According to the above aspect, although the line pressure overshoots the first target pressure, in terms of control it is recognized as no overshooting occurred due to the target line pressure being increased to the second target pressure. Therefore, the activity of the line pressure regulator valve is suppressed and the undershooting that occurs as a shake-back of the overshooting is prevented.

Advantages of the embodiments of the present invention and the present invention will be specifically described below with reference to the accompanied drawings.

DESCRIPTION OF EMBODIMENTS

Figure 1:
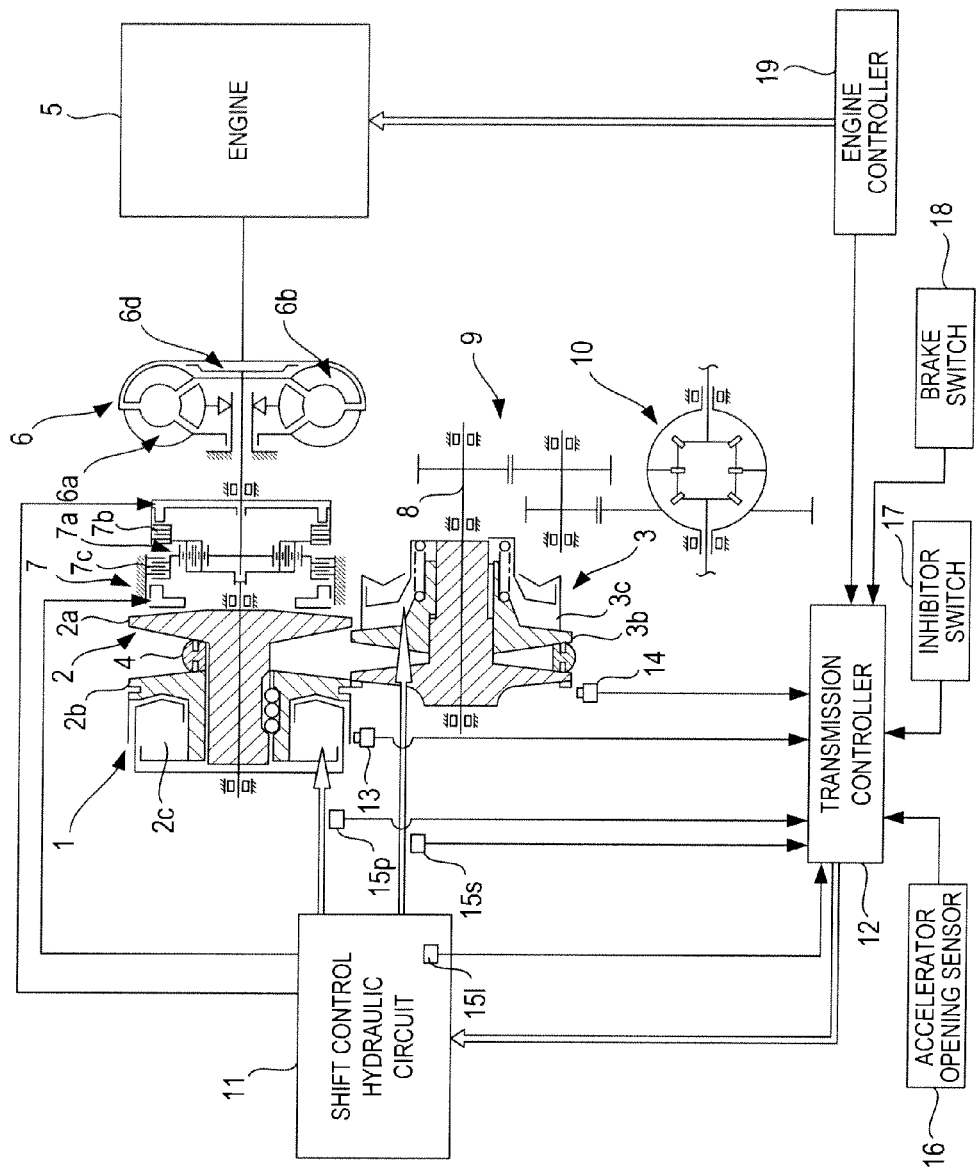
FIG. 1 is a schematic view of an arrangement of a continuously variable transmission.

FIG. 1 shows a schematic view of an arrangement of a continuously variable transmission (hereinafter, referred to as "CVT") 1. A primary pulley 2 and a secondary pulley 3 are disposed so that grooves of both these members are arranged in one line, and a belt 4 is wound around the grooves of the pulleys 2 and 3. An engine 5 is disposed coaxially to the primary pulley 2, and a torque converter 6 and a forward and backward switching mechanism 7 are provided between the engine 5 and the primary pulley 2 in this order from the side of the engine 5.

The torque converter 6 includes a pump impeller 6a connected to an output shaft of the engine 5, a turbine runner 6b connected to an input shaft of the forward and backward switching mechanism 7, a stator 6c, and a lock-up clutch 6d.

The main component of the forward and backward switching mechanism 7 is a double pinion planetary gear set 7a. A sun gear of the double pinion planetary gear set 7a is connected to the turbine runner 6b of the torque converter 6 and a carrier of the double pinion planetary gear set 7a is connected to the primary pulley 2. The forward and backward switching mechanism 7 further includes a start clutch 7b that directly connects the sun gear and the carrier of the double pinion planetary gear set 7a, and a reverse brake 7c that fixes the ring gear. When the start clutch 7b is engaged, an input rotation from the engine 5 via the torque converter 6 is transmitted as it is to the primary pulley 2, and when the reverse brake 7c is engaged, the input rotation from the engine 5 via the torque converter 6 is reversed and is transmitted to the primary pulley 2.

The rotation of the primary pulley 2 is transmitted to the secondary pulley 3 via the belt 4, and the rotation of the secondary pulley 3 is transmitted to driving wheels not illustrated, via an output shaft 8, a gear set 9 and a differential gear device 10.

In order to allow a change in a speed ratio between the primary pulley 2 and the secondary pulley 3 during the above power transmission, each of one of conical plates that form respective grooves of the primary pulley 2 and the secondary pulley 3 is made to serve as fixed conical plates 2a and 3a, respectively, and the respective other conical plates 2b and 3b are to be movable conical plates capable of being displaced in a shaft line direction.

These movable conical plates 2b and 3b are biased toward the fixed conical plates 2a and 3a by applying, to the primary pulley chamber 2c and the secondary pulley chamber 3c, a primary pressure Ppri and a secondary pressure Psec generated based on the line pressure PL as a source pressure, and the belt 4 thus is rubbed in contact to the conical plate to transmit power between the primary pulley 2 and the secondary pulley 3.

The shift is carried out by changing the width of the groove between both pulleys 2 and 3 by differential pressure between the primary pressure Ppri and the secondary pressure Psec, and continuously changing a diameter of a wound arc of the belt 4 with respect to the pulleys 2 and 3.

The primary pressure Ppri and the secondary pressure Psec are controlled by a shift control hydraulic circuit 11 together with an applied hydraulic pressure to the start clutch 7b engaged when selecting a forward running range and a reverse brake 7c engaged when selecting a reverse running range. The shift control hydraulic circuit 11 is controlled in response to a signal from a transmission controller 12.

The transmission controller 12 receives a signal from an input rotational speed sensor 13 that detects an actual input rotational speed Nin of a CVT1, an output rotational speed of the CVT1, that is to say, a signal from a vehicle speed sensor 14 that detects a vehicle speed VSP, a signal from a primary pressure sensor 15p that detects the primary pressure Ppri, a signal from a secondary pressure sensor 15s that detects the secondary pressure Psec, a signal from a line pressure sensor 15l that detects a line pressure PL, a signal from an accelerator opening sensor 16 that detects an accelerator opening APO, a selection range signal from an inhibitor switch 17 that detects a selected lever position, a signal from a brake switch 18 that detects whether or not the brake pedal is treaded, and a signal related to an operated state (e.g. engine rotational speed Ne, engine torque, fuel injection time, cooling water temperature TMPe) of the engine 5 from an engine controller 19 that controls the engine 5.

Figure 2:
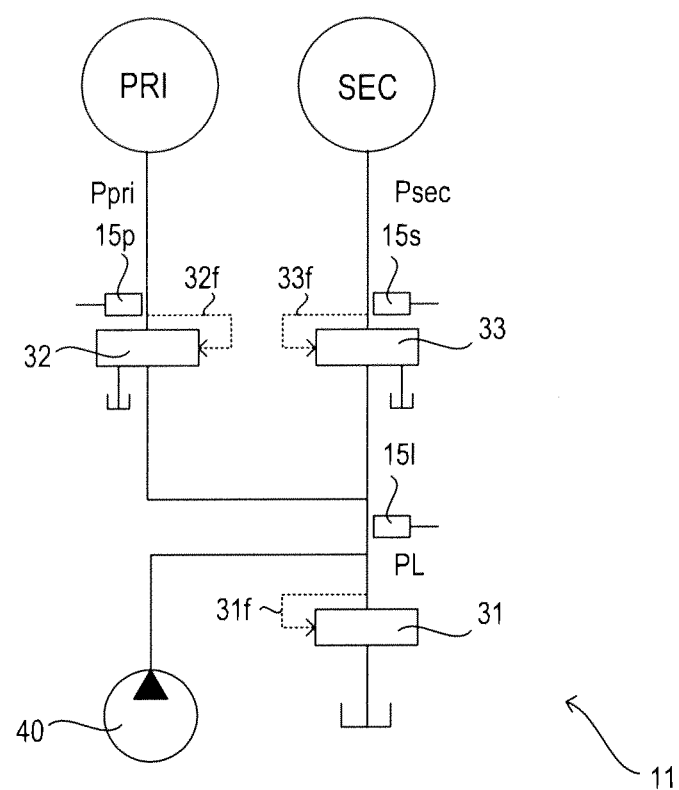
FIG. 2 is a schematic view of an arrangement of a shift control hydraulic circuit.

FIG. 2 shows a schematic view of an arrangement of the shift control hydraulic circuit 11.

The shift control hydraulic circuit 11 includes an oil pump 40, a line pressure regulator valve 31, a primary pressure regulator valve 32 and a secondary pressure regulator valve 33.

The oil pump 40 is driven by the engine 5.

The line pressure regulator valve 31 is a drain regulator valve that regulates the line pressure PL to a target line pressure tPL by draining and reducing the pressure of a portion of a discharge pressure of the oil pump 40.

The primary pressure regulator valve 32 and the secondary pressure regulator valve 33 are drain regulator valves that regulate the primary pressure Ppri and the secondary pressure Psec to a target primary pressure tPpri and a target secondary pressure tPsec, respectively, having the line pressure PL serve as a source pressure and by draining and reducing the pressure of a portion of the line pressure PL.

The line pressure regulator valve 31, the primary pressure regulator valve 32 and the secondary pressure regulator valve 33 each have a feedback circuit 31f, 32f and 33f, respectively, to return the regulated hydraulic pressure to the regulator valve and to feedback control the regulated hydraulic pressure to a target hydraulic pressure.

Figure 3:
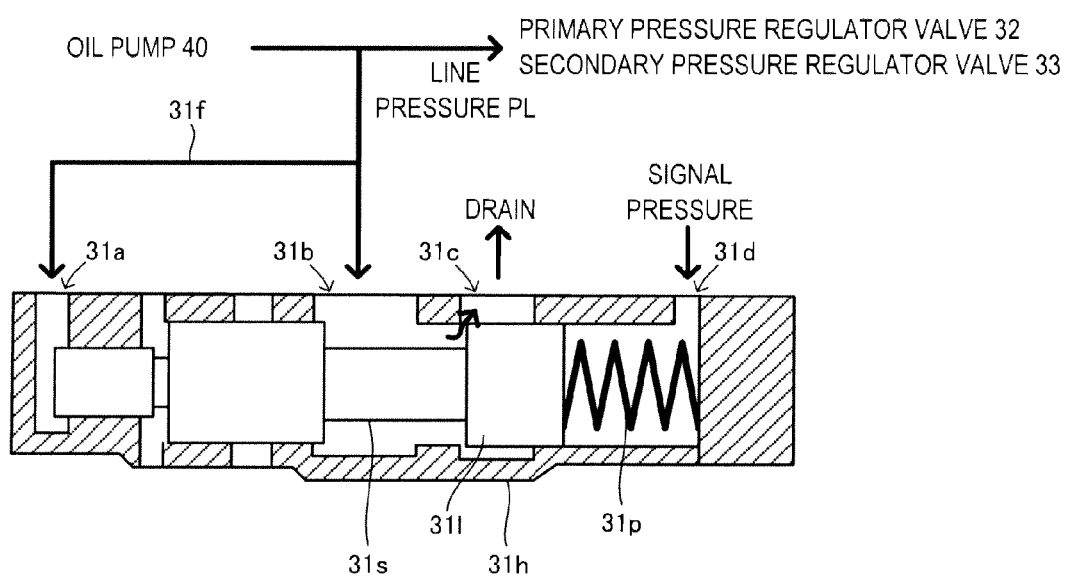
FIG. 3 is a schematic view of an arrangement of a line pressure regulator valve.

FIG. 3 shows a schematic view of an arrangement of the line pressure regulator valve 31. Although the arrangement of the line pressure regulator valve 31 is described here, the primary pressure regulator valve 32 and the secondary pressure regulator valve 33 will also be of similar arrangements.

The line pressure regulator valve 31 includes a spool 31s, a housing 31h containing the spool 31s inside, and a spring 31p provided between the spool 31s and the housing 31h.

The housing 31h has opened ports 31a to 31d. The port 31a is connected to the port 31b via the feedback circuit 31f. The port 31b is connected between the oil pump 40 and the primary and secondary pressure regulator valve 32, 33. The port 31c is the drain port. The port 31d is connected to a solenoid valve (not illustrated).

A land section 31l of the spool 31s is disposed inside the port 31c, and the port 31c is adjusted in its opening by the land section 31l.

The port 31d is supplied with a signal pressure corresponding to a target line pressure tPL from the solenoid valve, and the signal pressure acts on a right end face of the spool 31s. As the signal pressure increases, the spool 31s moves to the left side in the drawing, which causes the opening of the port 31c to decrease. As a result, the drained content from the port 31c decreases and the line pressure PL increases. On the other hand, when the signal pressure applied to the port 31d decreases, the spool 31s moves to the right side in the drawing, which causes the opening of the port 31c to increase. As a result, the drained content from the port 31c increases and the line pressure PL decreases.

The line pressure PL regulated as such is also applied to the port 31a via the feedback circuit 31f, and acts on a left end face of the spool 31s. If the regulated line pressure PL matches the target line pressure tPL, the line pressure PL, the signal pressure and a biasing force of the spring 31p become balanced, and the spool 31s maintains a stroke at that time.

In contrast, if the regulated line pressure PL is lower than the target line pressure tPL, the spool 31s moves to the left side in the drawing and the opening of the port 31c decreases, which causes the drain content to decrease and the line pressure PL to increase. On the other hand, if the regulated line pressure PL is higher than the target line pressure tPL, the spool 31s moves to the right side in the drawing and the opening of the port 31c increases, which causes an increase in the drained content and a decrease in the line pressure PL.

As a result, the line pressure PL is feedback controlled to achieve the target line pressure tPL (self-feedback).

In a situation in which the oil flow balance is sufficient, the port 31c will not be closed, however if the oil flow balance is insufficient, the port 31c will be closed to obtain a line pressure PL as high as possible.

Therefore, in a situation in which the target line pressure tPL rapidly increases due to a kickdown and the oil flow balance is insufficient, the port 31c of the line pressure regulator valve 31 is closed, and in this case, the line pressure PL overshoots the target line pressure tPL. If no measure is taken against this, the line pressure PL undershoots the target line pressure tPL as a shake-back thereof, and the belt 4 may slip.

Accordingly, in the present embodiment, a hydraulic control is carried out at the time of the kickdown as described below.

Figure 4:
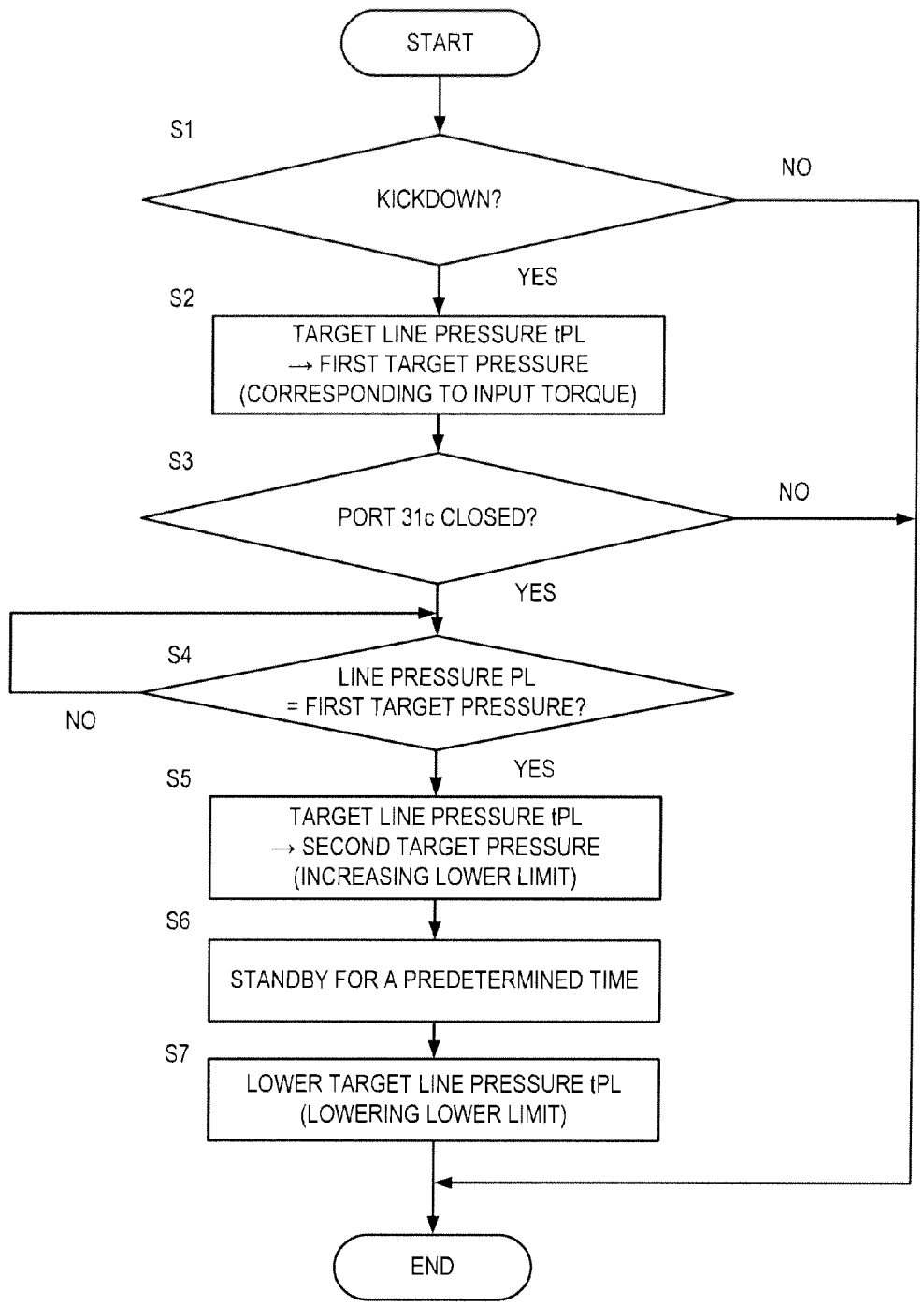
FIG. 4 is a flow chart showing details of a hydraulic control carried out at the time of a kickdown.

FIG. 4 is a flowchart showing the details of a hydraulic control at the time of a kickdown. The control at the time of the kickdown will be described with reference to this drawing.

First, in S1, the transmission controller 12 determines if the shift is a kickdown (a downshift occurring when the accelerator pedal is treaded suddenly and greatly). Whether the shift is a kickdown can be determined based on the amount and speed of the change in the accelerator opening APO.

If the shift is determined as the kickdown, the process proceeds to S2, and if not, the process terminates.

In S2, the transmission controller 12 increases the target line pressure tPL to a first target pressure corresponding to an input torque to the CVT1 increased by the kickdown (i.e., a final target pressure required after the shift) (first stage pressure increasing). This increases the clipping pressure of the belt 4 by the secondary pulley 3, thereby preventing the belt 4 from slipping.

In S3, the transmission controller 12 determines whether the port 31c of the line pressure regulator valve 31 is closed. As described above, the port 31c is closed when the oil flow balance is insufficient, and this determination is made based on the engine rotational speed Ne, the line pressure PL and the speed ratio. More specifically, when the engine rotational speed Ne is lower than a predetermined value (the discharge pressure of the oil pump 40 is low), the line pressure PL is lower than a predetermined value (the actual pressure is low), and the speed ratio is on a higher side than a predetermined speed ratio (the increment in hydraulic pressure required at the kickdown is great), it is determined that the oil flow balance is insufficient and the port 31c is to be closed.

When it is determined that the port 31c is to be closed, the line pressure PL overshoots, so the process proceeds to S4 and subsequent steps in order to carry out processes for preventing the undershooting caused by the shake-back. If that is not the case, the process terminates.

In S4, the transmission controller 12 determines whether the line pressure PL is increased to the first target pressure. If an affirmative determination is made, the process proceeds to S5, and if not the determination of S4 is repeated. This determination is made since the overshooting of the line pressure PL occurs immediately after the line pressure PL is increased to the first target pressure, and it is preferable to start the process of S5 and subsequent processes for preventing the shake-back of the overshooting at a timing that the line pressure PL is increased to the first target pressure.

In S5, the transmission controller 12 increases the target line pressure tPL to a second target pressure higher than the first target pressure (second stage pressure increasing). This process is carried out by setting a lower limit of the target line pressure tPL to the second target pressure that is higher than the first target pressure, and restricting the lower limit of the target line pressure tPL by using that lower limit.

The second target pressure is set at a higher value than a pressure at the time when the overshooting of the line pressure PL occurs with respect to the first target pressure. This makes the target line pressure tPL higher than the line pressure PL. Accordingly, in terms of control, this is recognized as no overshoot occurring, and therefore the spool 31 s will not be pushed back in a direction to open the port 31c by the action of the feedback circuit 31f and thus no undershooting will occur as a shake-back.

Since the situation is that the oil flow balance is insufficient, even if the target line pressure tPL is increased to the second target pressure, the line pressure PL will not overshoot the second target pressure.

In S6, the transmission controller 12 standbys for a predetermined time. As a result, the line pressure PL is maintained high, and the undershooting caused by the shake-back can be securely prevented.

In S7, the transmission controller 12 lowers the target line pressure tPL in a predetermined ramp gradient by lowering the lower limit used in S5. This is to lower the line pressure PL that is excessive with respect to the input torque, which excess is caused by increasing the target line pressure tPL to the second target pressure, to a pressure corresponding to the input torque. The reason why the line pressure PL is reduced in a predetermined ramp gradient is to prevent an undershooting of the line pressure PL to the target line pressure tPL that occurs in an event of rapidly lowering the target line pressure tPL, which undershooting is caused by a delay due to a spring mass system of the line pressure regulator valve 31.

According to the above processes, even if the target line pressure tPL is rapidly increased by the kickdown and the oil flow balance becomes insufficient, it is possible to prevent the undershooting from occurring as a result of a shake-back of the overshooting of the line pressure PL, and prevent the belt from slipping.

A similar control is carried out to the secondary pressure regulator valve 33.

That is to say, in a case in which the target secondary pressure tPsec is rapidly increased by a kickdown and the oil flow balance becomes insufficient, the target secondary pressure tPsec is increased to the second target pressure higher than the first target pressure that corresponds to the input torque.

Thus, even if the secondary pressure Psec overshoots the first target pressure, in terms of control it is recognized as no overshoot being occurred. As a result, the action of the secondary pressure regulator valve 33 for lowering the secondary pressure Psec is suppressed and the undershooting occurring as a shake-back of the overshooting is prevented.

Next describes the effects achieved by carrying out the hydraulic control at the time of the kickdown.

Figure 5:
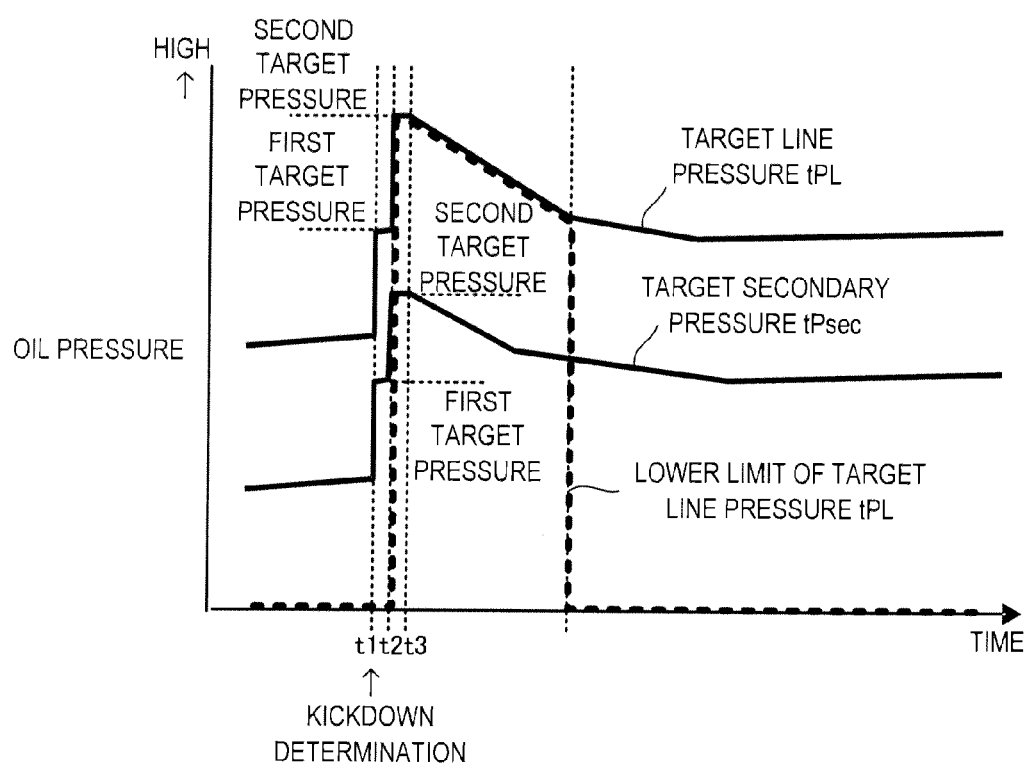
FIG. 5 is a time chart showing changes in a target line pressure and a target secondary pressure at the time of the kickdown.

FIG. 5 shows changes in the target line pressure tPL and the target secondary pressure tPsec at the time of the kickdown.

If it is determined that the shift is a kickdown at a time t1 the target line pressure tPL and the target secondary pressure are each rapidly increased to the first target pressure corresponding to the input torque following the shift. As a result, the oil flow balance becomes insufficient, and the port 31c of the line pressure regulator valve 31 and the drain port of the secondary pressure regulator valve 33 are closed. The insufficient oil flow balance is temporary, and once the engine rotational speed Ne increases and the discharge pressure of the oil pump 40 is increased, the insufficient state in the oil flow balance will be overcome.

Once the line pressure PL and the secondary pressure Psec each reach the first target pressure at a time t2, the target line pressure tPL and the target secondary pressure are set to a further higher second target pressure. Although the line pressure PL and the secondary pressure Psec each overshoot the first target pressure, by having the target line pressure tPL and the targ secondary pressure tPsec increased to the second target pressure, in terms of control it is recognized as no overshooting being occurred, and the actions of the line pressure regulator valve 31 and the secondary pressure regulator valve 33 are suppressed. As a result, the undershooting that occurs as the shake-back of the overshooting is prevented.

During the times t2 to t3, the target line pressure tPL and the target secondary pressure tPsec are maintained at the second target pressure for a predetermined time. This enables to securely prevent the undershooting as a shake-back of the overshooting.

Thereafter, at the time t3 and thereafter, the target line pressure tPL and the target secondary pressure tPsec are lowered in a predetermined ramp gradient. This thus overcomes the excess state of the hydraulic pressure with respect to the input torque, and prevents the occurrence of the undershooting caused by a rapid decrease in the target line pressure tPL and the target secondary pressure tPsec.

The second stage pressure increasing of the target line pressure tPL and the target secondary pressure tPsec is carried out only when the oil flow balance is insufficient in the first stage pressure increasing and the port 31c of the line pressure regulator valve 31 and the drain port of the secondary pressure regulator valve 33 are closed. Therefore, it is possible to prevent any deterioration in fuel efficiency caused by unnecessary pressure increase.

The above described an embodiment of the present invention, however the embodiment is merely a portion of application examples of the present invention, and no intention is made to specifically limit the technical scope of the present invention to the above embodiment.

The present application claims priority on the basis of Japanese Patent Application No. 2012-130650 filed with the Japan Patent Office on Jun. 8, 2012, the entire contents thereof being incorporated by reference in the present description.

The invention claimed is:

1. A continuously variable transmission that includes a primary pulley, a secondary pulley and a power transmission member wound between the pulleys and shifts by changing a groove width of each of the pulleys by changing a primary pressure supplied to the primary pulley and a secondary pressure supplied to the secondary pulley, the continuously variable transmission comprising:
   an oil pump driven by an engine;
   a line pressure regulator valve which is a drain regulator valve that reduces a discharge pressure of the oil pump to regulate a line pressure which is a source pressure of the primary pressure and the secondary pressure, the line pressure regulator valve including a spool on whose edges a signal pressure corresponding to a target line pressure and the line pressure are acted and which opens and closes a drain port in accordance with a stroke, and a spring that biases the spool;
   a kickdown determining unit adapted to determine whether a shift is a kickdown;
   a first pressure increasing unit adapted to increase the target line pressure to a first target pressure corresponding to an input torque to the continuously variable transmission that increases by the kickdown, when the shift is determined as the kickdown;
   a pressure increasing determining unit adapted to determine whether the line pressure has reached the first target pressure; and
   a second pressure increasing unit adapted to increase the target line pressure to a second target pressure higher than the first target pressure, when the line pressure is determined as reaching the first target pressure.

2. The continuously variable transmission according to claim 1, wherein the second pressure increasing unit maintains the target line pressure at the second target pressure for a predetermined time.

3. The continuously variable transmission according to claim 2, wherein after the target line pressure is maintained at the second target pressure for a predetermined time, the second pressure increasing unit reduces the target line pressure in a predetermined ramp gradient.

4. The continuously variable transmission according to claim 1, wherein when the line pressure is determined as reaching the first target pressure and the drain port is determined as being closed by the spool as a result of increasing the target line pressure by the first pressure increasing unit, the second pressure increasing unit increases the target line pressure to the second target pressure higher than the first target pressure.

5. The continuously variable transmission according to claim 1, wherein the first pressure increasing unit increases the secondary pressure together with increasing the line pressure.

6. A method of a controlling a continuously variable transmission according to claim 1, the method comprising:
   determining whether the shift is the kickdown;
   increasing the target line pressure to the first target pressure corresponding to the input torque to the continuously variable transmission that increases by the kickdown, when the shift is determined as the kickdown;
   determining whether the line pressure has reached the first target pressure; and
   increasing the target line pressure to the second target pressure higher than the first target pressure, when the line pressure is determined as reaching the first target pressure.

7. A continuously variable transmission that includes a primary pulley, a secondary pulley and a power transmission member wound between the pulleys and shifts by changing a groove width of each of the pulleys by changing a primary pressure supplied to the primary pulley and a secondary pressure supplied to the secondary pulley, the continuously variable transmission comprising:
   an oil pump driven by an engine;
   a line pressure regulator valve which is a drain regulator valve that reduces a discharge pressure of the oil pump to regulate a line pressure which is a source pressure of the primary pressure and the secondary pressure, the line pressure regulator valve including a spool on whose edges a signal pressure corresponding to a target line pressure and the line pressure are acted and which opens and closes a drain port in accordance with a stroke, and a spring that biases the spool;

kickdown determining means determining whether a shift is a kickdown;

first pressure increasing means for increasing the target line pressure to a first target pressure corresponding to an input torque to the continuously variable transmission that increases by the kickdown, when the shift is determined as the kickdown;

pressure increasing determining means for determining whether the line pressure has reached the first target pressure; and second pressure increasing means for increasing the target line pressure to a second target pressure higher than the first target pressure, when the line pressure is determined as reaching the first target pressure.

\* \* \* \* \*